Figure 1:
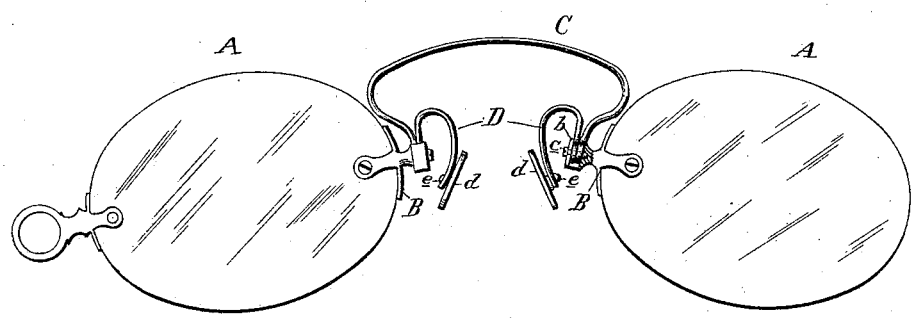

(No Model.)

H. BORSCH.
EYEGLASSES.

No. 396,264.  Patented Jan. 15, 1889.

WITNESSES:
C. H. Raeder.
E. H. Bond.

INVENTOR,
Henry Borsch
BY J. J. W. Robertson
ATTORNEY.

UNITED STATES PATENT OFFICE.

HENRY BORSCH, OF CHICAGO, ILLINOIS.

EYEGLASSES.

SPECIFICATION forming part of Letters Patent No. 396,264, dated January 15, 1889.

Application filed March 29, 1888. Serial No. 268,829. (No model.)

*To all whom it may concern:*

Be it known that I, HENRY BORSCH, a citizen of the United States, residing at Chicago, in the county of Cook and State of Illinois, have invented certain new and useful Improvements in Eyeglasses, of which the following is a specification, reference being had therein to the accompanying drawings.

This invention relates to certain new and useful improvements in eyeglasses, and has for its object to simplify and cheapen and to render more durable and efficient in operation this class of devices.

The novelty resides in the peculiarities of construction and the combinations, arrangement, and adaptation of parts, all as more fully hereinafter described, shown in the drawings, and then particularly defined by the appended claim.

The invention is clearly illustrated in the accompanying drawings, in which—

Figure 2:
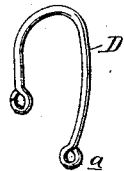
Figure 3:
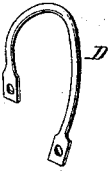
Figure 4:
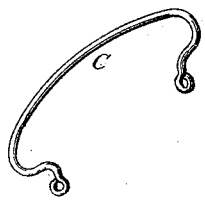

Figure 1 represents an elevation, on an enlarged scale, of a pair of eyeglasses fitted with my improvement, with part broken away. Fig. 2 is a perspective view of one of the nose-pieces detached on a still larger scale; Fig. 3, a similar view of a slightly-modified form of nose-piece; and Fig. 4 is a similar view of the spring connecting the lenses.

Referring to the details of the drawings by letter, A designates the lenses, B the clasps, and C the spring connecting the lenses, all of which may be of any well-known or approved form, except as hereinafter specified.

D represents the nose-pieces, which are of wire, with the ends formed either into eyes $a$, as shown in Fig. 2, or flattened and provided with suitable holes to receive the screws which secure them to the posts of the clasps, as shown in Fig. 3; but I prefer the former, as it is more easily made and more durable.

The nose-pieces are retained in position by means of the cap $b$ and screw $c$, which secure the spring C to the clasps, said screws passing through the caps $b$ and eyes $a$, which allow the nose-pieces to be turned thereon to adjust them to the nose of the wearer.

The nose-pieces may be faced with cork, rubber, celluloid, or any other suitable material, $d$, which is secured thereto by means of the screws or rivets $e$ passing through the eyes $a$ of the nose-pieces or the holes in the flattened ends thereof, as the case may be.

I form the spring C of wire, as shown in Fig. 4, the ends thereof being either formed with eyes or flattened and provided with holes similar to the ends of the wire nose-pieces above described.

I deem it important that the nose-pieces be formed of round wire, for when thus made they may be bent readily to assume any position desired, while with flat or sheet-metal nose-pieces it is difficult to bend them except in a direction to and from each other. Furthermore, with round wire the ends can be quickly and easily bent to form eyes, by which they can be fastened to the clasps.

Heretofore nose-pieces have been formed of flat metal, which allowed of adjustment in certain directions, but not to such an extent as has been found necessary to provide for the various angles at which it is desired to adjust them in practice.

The round-wire spring has the advantage of forming a cheaper, lighter, and more durable spring, as the wire can be drawn very hard, and, after being so drawn and cut in proper length for springs, can have their ends bent to form eyes by which they can be fastened to the clasp, whereas if made of hard flat springs it is difficult to drill the holes in the ends without taking out the temper. The round-wire springs are less likely to break than the others, and are hence more durable, and, being thus stronger, can be made lighter.

What I claim as new is—

The combination, with the lenses and clasps, of a round-wire nose-piece bent into an inverted-U shape, with one arm longer than the other, the outer extremities of the arms being free of each other and the shorter arm secured to the clasp with the free end of the longer arm extended below the end of the shorter arm and carrying a facing, substantially as described.

In testimony whereof I affix my signature, in presence of two witnesses, this 27th day of March, 1888.

HENRY BORSCH.

Witnesses:
T. J. W. ROBERTSON,
M. P. CALLAN.